United States Patent [19]

Williams

[11] 4,170,213

[45] Oct. 9, 1979

[54] ROTARY ENGINE

[75] Inventor: Benjamin F. Williams, Douglas, Ariz.

[73] Assignee: Benwilco, Inc., Douglas, Ariz.

[21] Appl. No.: 774,854

[22] Filed: Mar. 7, 1977

[51] Int. Cl.$^2$ ............................................. F02B 53/00
[52] U.S. Cl. ..................................... 123/222; 123/237
[58] Field of Search .................... 123/8.17, 8.23, 8.35, 123/8.41; 418/162, 211, 217

[56] References Cited

U.S. PATENT DOCUMENTS

| | | | |
|---|---|---|---|
| 1,412,296 | 4/1922 | Stowe | 123/8.35 |
| 1,427,692 | 8/1922 | Mahon et al. | 123/8.45 X |
| 1,464,408 | 8/1923 | Collier | 123/8.35 |
| 2,070,606 | 2/1937 | Lickfeldt | 123/8.41 X |
| 3,181,511 | 5/1965 | Johnson | 123/8.17 |
| 3,787,153 | 1/1974 | Williams | 418/211 X |
| 3,818,886 | 6/1974 | Blaszczynski | 123/8.41 |

FOREIGN PATENT DOCUMENTS

| | | |
|---|---|---|
| 414412 | 6/1925 | Fed. Rep. of Germany .......... 123/8.17 |
| 1451794 | 5/1969 | Fed. Rep. of Germany .......... 123/8.35 |

*Primary Examiner*—Carlton R. Croyle
*Assistant Examiner*—Michael Koczo, Jr.
*Attorney, Agent, or Firm*—Lothrop & West

[57] ABSTRACT

A rotary engine, preferably operating on the 4-event Otto cycle, has a stator ring stationary on a base which also supports a shaft rotational about an axis. The stator ring has oppostie faces normal to the axis. A pair of rotor rings concentric with and mounted on the shaft abut the stator ring side faces. There are cylinders through the stator ring with their axes parallel to the shaft axis. Hollow pistons in the cylinders at their opposite ends bear against cam rings facing and complementary to each other and disposed in the rotor rings. The stator, pistons and cam rings define separate, variable volume chambers to which fuel mixture is supplied through ports in the stator ring and in the piston walls. Ignition devices fire the fuel mixture inside the hollow pistons. Exhaust is through ports in the pistons and stator ring. Lubrication and water cooling connections are provided to and from the stator ring.

2 Claims, 8 Drawing Figures

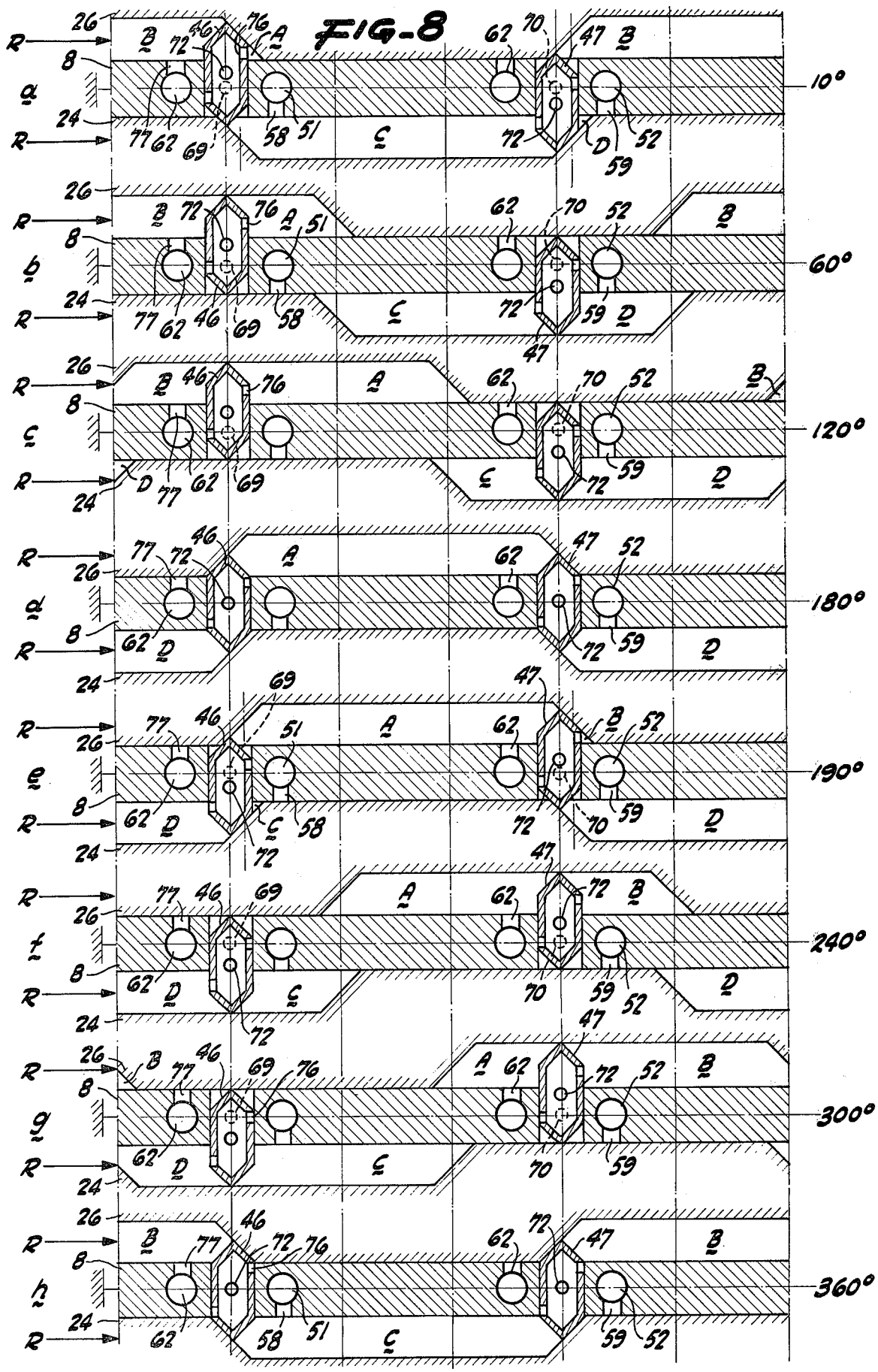

ROTARY ENGINE

BRIEF SUMMARY OF THE INVENTION

In order to increase the efficiency, economy, compactness and smoothness of operation of an internal combustion engine, the engine is made rotary about a shaft axis. The shaft is appropriately supported on a fixed base, which also supports a central stator having side faces normal to the axis. Against opposite sides of the stator there are disposed rotor rings fast on the shaft and rotatable about the axis. Inside of the rotor rings and facing each other in a complementary fashion are undulatory or sinusoidal cam rings that are substantially the same axial distance apart at all points. Hollow pistons having their longitudinal axes parallel to the rotational axis are disposed in cylinders entending through the stator. The ends of the pistons abut the cam rings and define and separate variable volume chambers. There are intake passages from a source of fuel mixture going through the stator ring and into the interior of the hollow pistons through appropriate ports. There is also an ignition mechanism effective through a port in the stator ring and another port in the piston wall to fire the fuel mixture within the interior of the hollow pistons. Furthermore, there are exhaust ports in the walls of the hollow pistons registering from time to time with adjacent chambers in turn communicating with exhaust ports in the stator. Lubrication of the rubbing parts and water cooling of certain portions of the mechanism are provided.

BRIEF DESCRIPTION OF THE SEVERAL VIEWS OF THE DRAWINGS

FIG. 8 is a series from a to h of schematic views showing the progression of the rotor rings throughout a complete cycle, the views being developed from a stator and rotor ring circumference on a mean piston radius.

DETAILED DESCRIPTION

Figure 1:
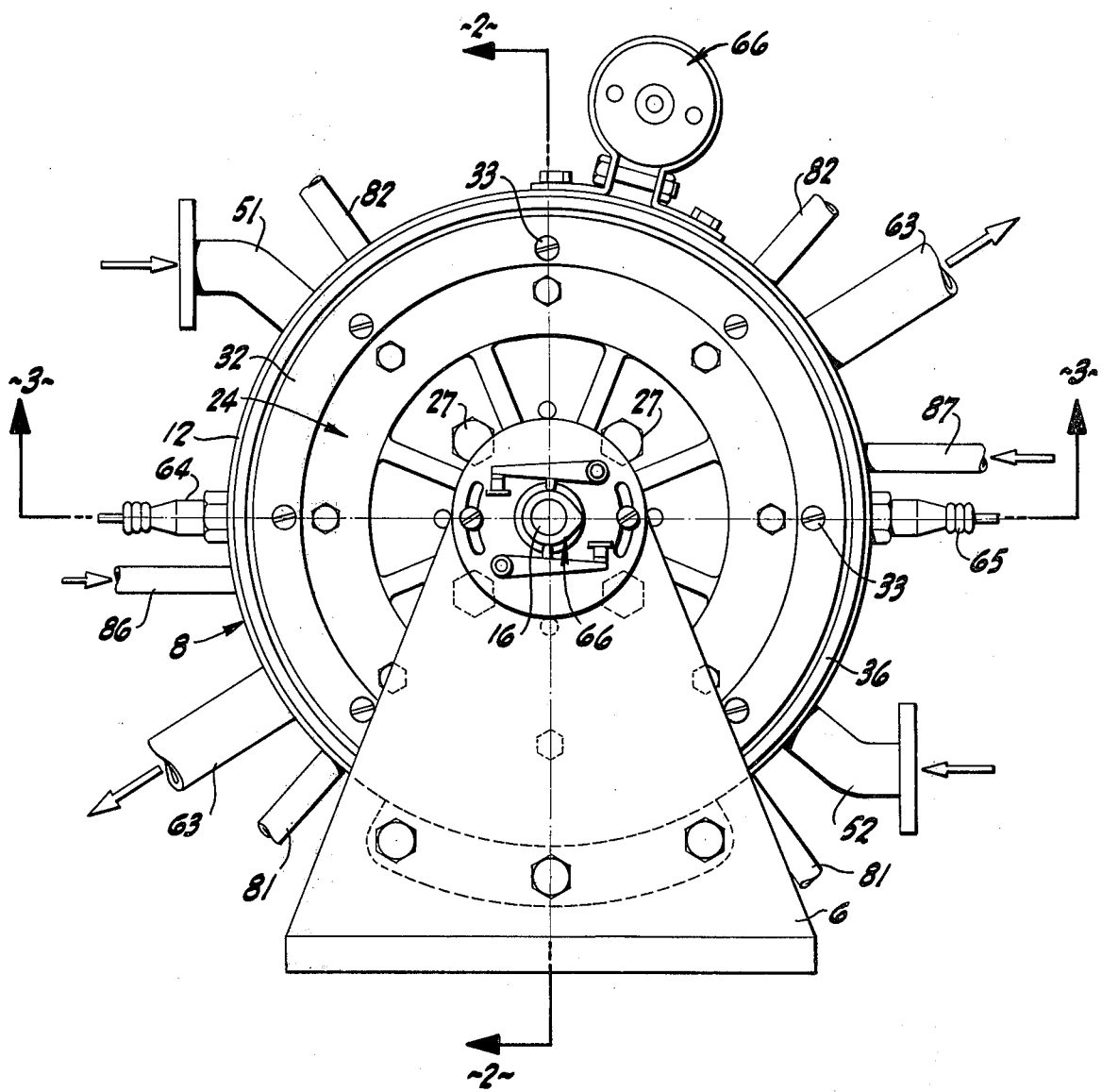
FIG. 1 is a side elevation of a rotary engine constructed pursuant to the invention, certain portions, such as the fuel mixture mechanism, exhaust mufflers and the like, being omitted for clarity.

There is provided herein a smooth-running, economical, simple and effective engine operable upon the 4-event Otto cycle or on 2-event or other Otto or diesel cycle. The engine does not have piston "strokes" in the usual sense, so the corresponding designation herein is "events". The engine is mounted on any suitable support and includes a pair of substantially identical base frame members 6 and 7. Adjacent their lower portions these members are extended to abut a stator 8 inclusive of an outer ring 9, an inner ring 11 and oppositely facing side plates 12 and 13. The side plates and the inner and outer rings are collectively referred to as a stator.

The frame members 6 and 7 together support a shaft 16 mounted in bearings 17 and 18 so that the shaft is rotatable freely about a transverse axis 19. The shaft has an integral, enlarged central hub 21 carried in bearings 22 and 23 in the stator 8.

Abutting the opposite sides of the stator is a pair of facing rotor rings 24 and 26. These are substantially identical and are symmetrically arranged around the axis 19 as a center. The rotor rings are secured to the hub 21 by through bolt and dowel fasteners 27. Each rotor ring is a composite and has an axially extending, cylindrical inner wall 28, a planar end wall 29 and a peripheral, axially extending, cylindrical wall 31. The wall 31 is provided with an inturned flange 32 through which fasteners 33 are extended to hold the peripheral wall 31 in position with the rest of the rotor. The rotor walls 28 and 31 each terminate in axially extending, circular labyrinth packing rings 34 and 35 interengaged with comparable configurations in the side plates 12 and 13 of the stator to provide running clearance therebetween and minimum leakage. Any leakage there may be past the outer labyrinth 34 discharges into a receiving cup 36 secured to the stator. This arrangement provides for the abutment, in effect, of the rotor rings on the opposite sides of the normal walls 37 of the stator and also defines annular cavities 38 and 39 in each of the rotor rings.

Individually disposed in each of the cavities 38 and 39 are cam rings 41 and 42 designed to fill a part of each cavity. The cam rings 41 and 42 are held in position by locating pins 43 engaging the other parts of the rotor rings and are complementary to each other. They have axially exposed, circumferentially sinusoidal surfaces 44 and 45, the two surfaces 44 and 45 complementing each other so that the axial distance between them at any point is a constant.

Figure 2:
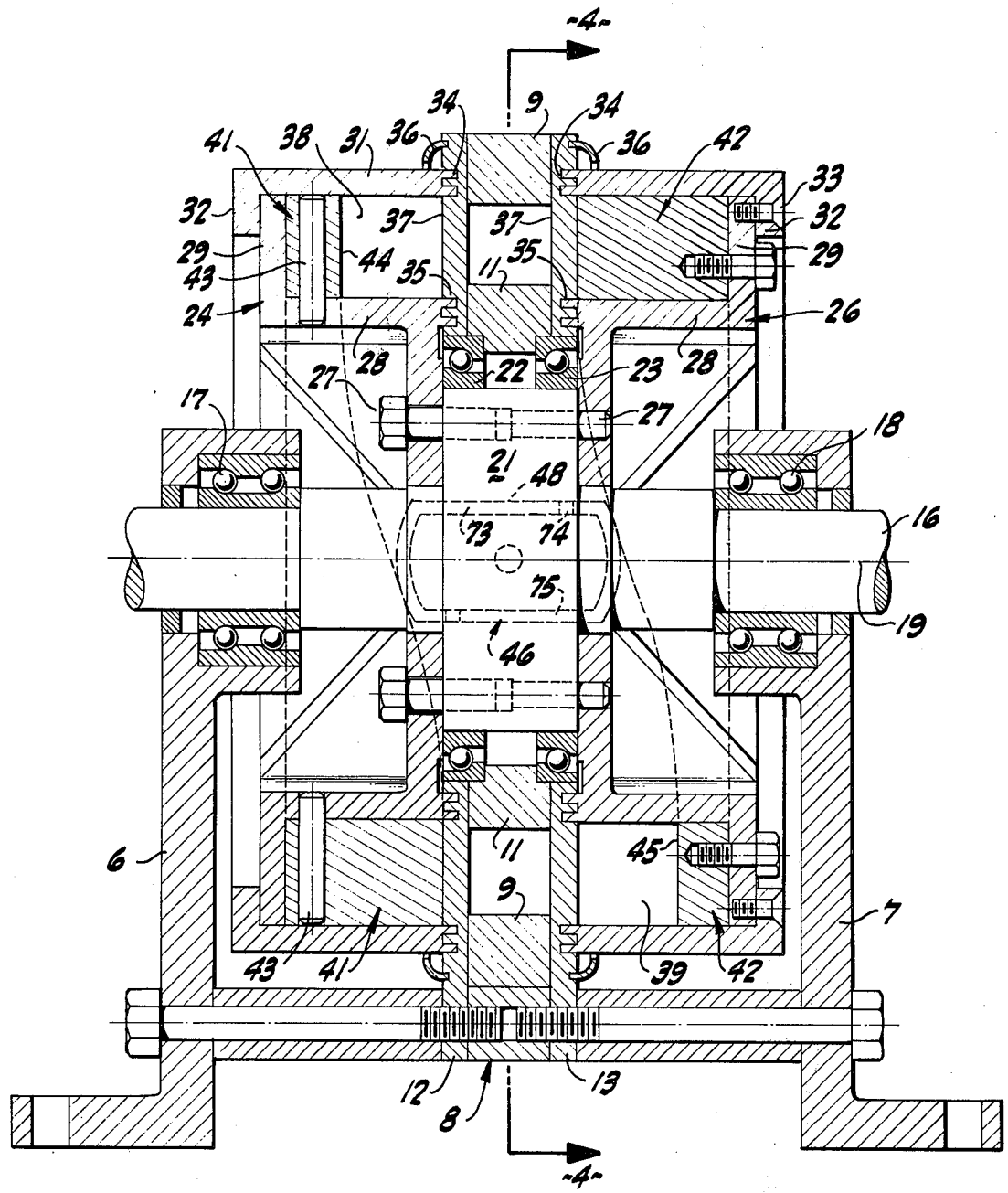
FIG. 2 is a cross-section to a larger scale, the plane of which is indicated by the line 2—2 of FIG. 1.
Figure 3:
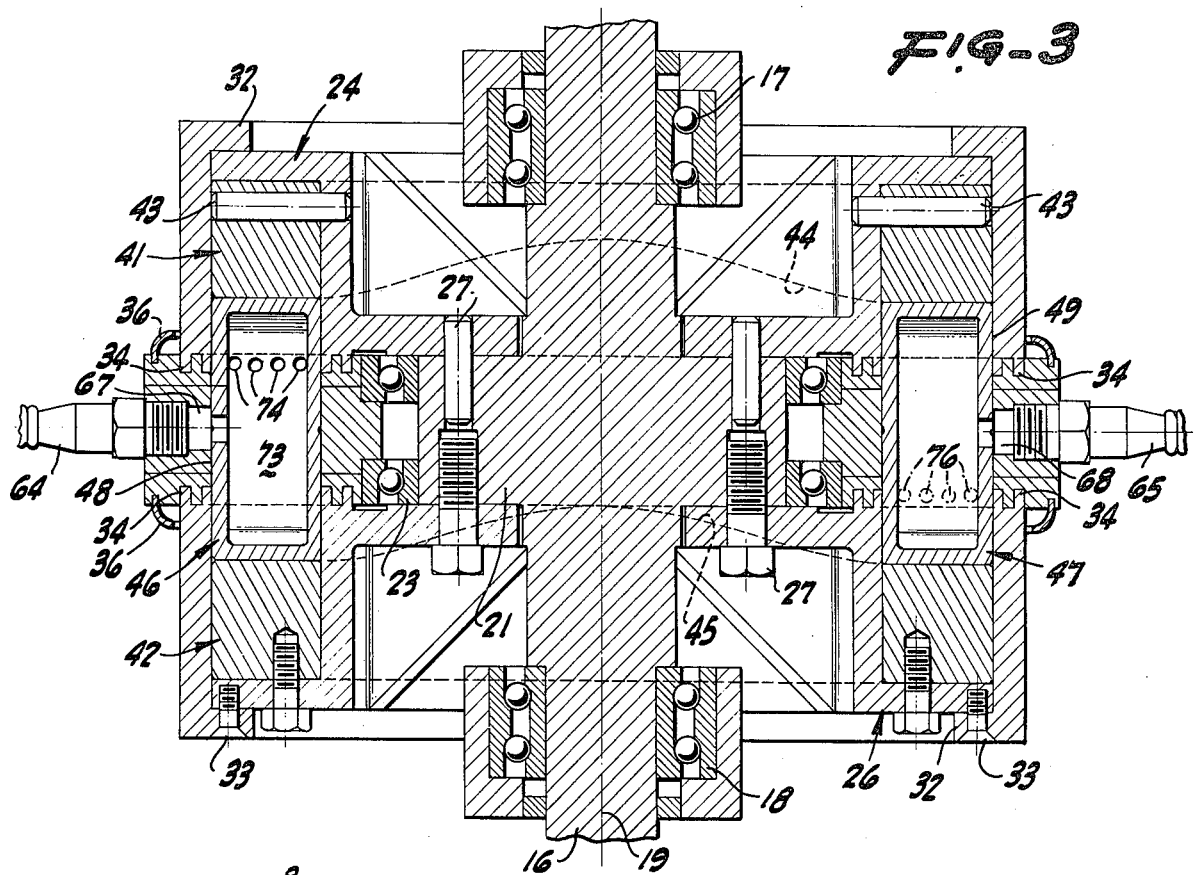
FIG. 3 is a cross-section to the scale of FIG. 2 and taken along the plane indicated by the line 3—3 of FIG. 1.
Figure 4:
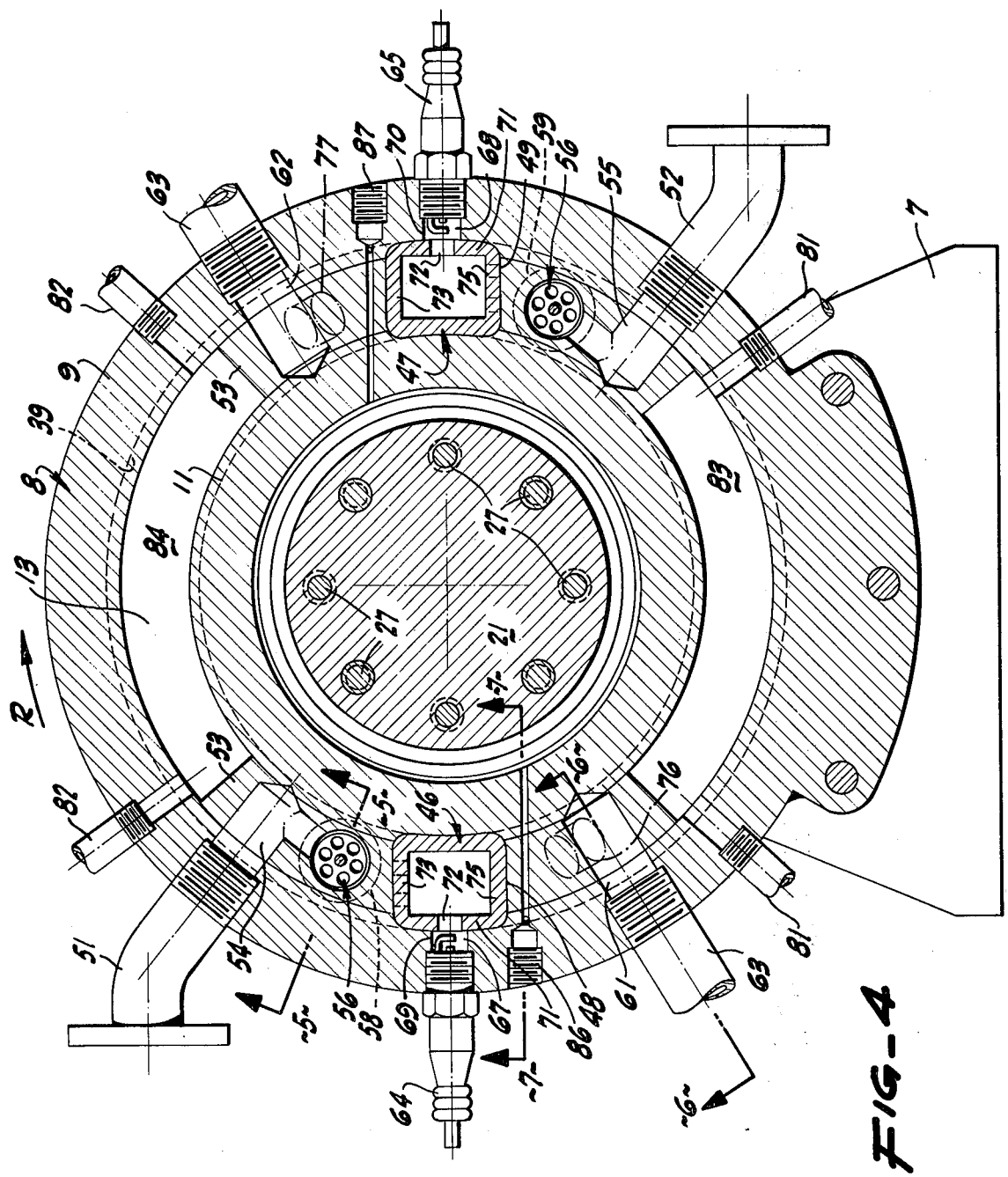
FIG. 4 is a cross-section, the plane of which is indicated by the line 4—4 of FIG. 2.

Designed to cooperate with the two cam rings 41 and 42 are hollow pistons 46 and 47 (FIGS. 3 and 4) arranged diametrically opposite each other and fitted to run in transversely extending cylinders 48 and 49 in the stator 8. As shown particularly in FIG. 4, the cylinders are approximately rectangular in cross-section normal to the axis 19. They are somewhat curved exteriorly and have rounded corners. They extend axially entirely through the stator. The pistons make a sliding fit in the cylinders and extend axially between the cam rings 41 and 42 and are tapered and curved at the ends (FIG. 2) to lie in approximately linear end abutment with the surfaces 44 and 45.

With this arrangement as so far described, rotation of the shaft 16 is accompanied by rotation of the rotor rings 24 and 26 together with their cam rings 41 and 42, so that the abutting pistons reciprocate to and fro in an axial direction. The configuration of the cam rings is such that each piston makes one complete round trip reciprocation for each complete rotation of the rotor rings. The pistons in effect act as dividers or delineators to separate successive variable volume chambers (see FIG. 8) as partly defined between the normal surfaces of the stator and the undulatory surfaces of the rotor rings, the chamber arrangement on one side of the normal center plane of the device being duplicated on the other side thereof, but being 180° out of phase therewith.

Figure 5:
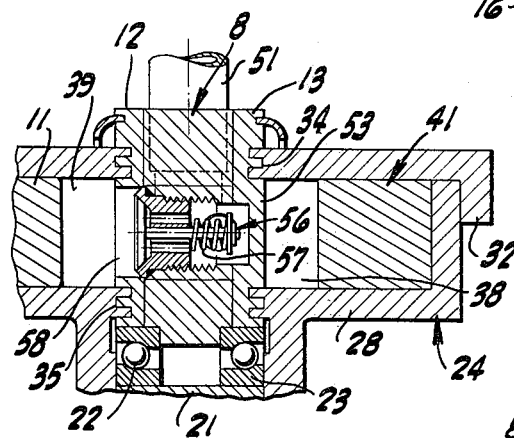
FIG. 5 is a detail in cross-section, the plane of which is indicated by the line 5—5 of FIG. 4.

In order to supply the variable volume chambers with a combustible fuel mixture, there are provided on the stator ring, at diametrically opposite points, induction pipes 51 and 52 connected to one or two fuel mixture supplying devices, not shown. The pipes 51 and 52, as particularly shown in FIG. 4, enter into the interior of the stator and into blocks 53 secured between the inner ring 11 and the outer ring 9. In the respective blocks 53 there are inlet passages 54 and 55 each carrying an inlet valve 56 of the poppet type normally urged closed by a spring 57. The inlet passages 54 and 55 respectively open through ports 58 and 59 (see FIGS. 5 and 8). In many instances, depending upon fuel mixtures and the like, the poppet valves 56 can be omitted.

Figure 6:
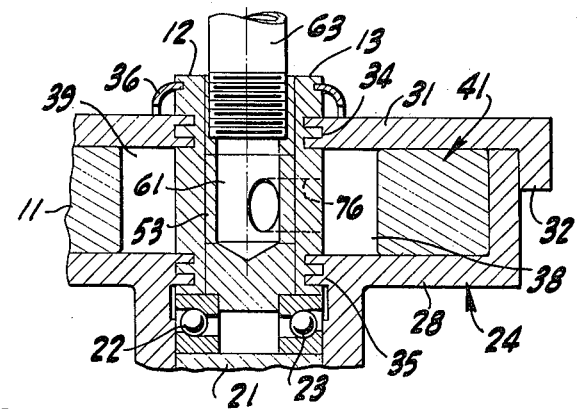
FIG. 6 is a detail in cross-section, the plane of which is indicated by the line 6—6 of FIG. 4.
Figure 7:
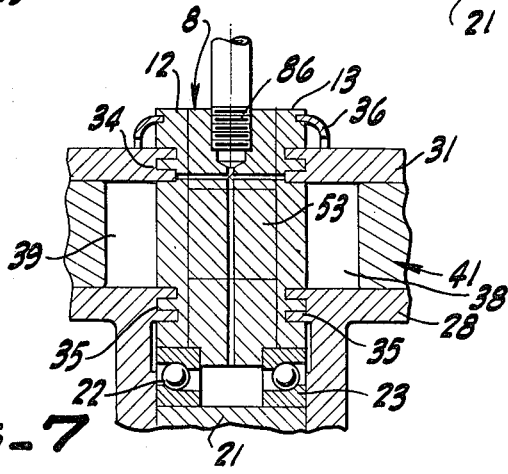
FIG. 7 is a detail showing in cross-section, the plane of which is indicated by the line 7—7 of FIG. 4.

Also provided in each block 53 on the circumferentially opposite side of the pistons are outlet passages 61 and 62 (see FIGS. 4, 6 and 8) opening into one of a pair of exhaust pipes 63 mounted in the stator and leading to appropriate exhaust gas receivers.

Mounted also in the stator ring diametrically opposite each other are ignition devices such as spark plugs 64 and 65. The plugs are fired in time by standard ignition timing devices 66 (FIG. 1). Each plug is provided with one of a pair of small ignition chambers 67 and 68 (FIG. 3) in the stator opening through ports 69 and 70 in the stator into the cylinders 48 and 49 adjacent thereto.

To cooperate with the various ports so provided in the stator, each of the hollow pistons 46 and 47 has corresponding ports arranged in connection with the stator ports to afford a proper ignition timing sequence for a 4-stroke Otto cycle operation. Substantially midway of its outermost wall 71, each of the pistons has an ignition port 72 designed to register with one of the ignition ports 69 and 70 when the piston is substantially midway in its path of excursion axially through the stator. Furthermore, each of the pistons has in one side wall 73 a transverse series of ports 74 (FIG. 3) designed to cooperate with the inlet port 58 (FIGS. 5 and 8) at an appropriate part of the cycle. Similarly, the opposite side wall 75 of each piston has a similar series of ports 76 designed to cooperate at the proper time in the cycle with ports 77 (FIGS 4 and 6) leading into the exhaust passages 61 and 62 and to the exhaust pipes 63.

Also extending into the stator are ducts 81 and 82 for the supply and discharge of cooling liquid from volumes 83 and 84 in parts of the stator not occupied by the blocks 53. This affords substantial liquid cooling of the stator and, by conduction, of the rotor rings as well. In addition, and for lubrication, the stator and the blocks 53 have oil supply passages 86 and 87 through which pressure oil is furnished to the mechanism in the vicinity of the bearings 22 and 23 and from which lubricant can flow to the various rubbing surfaces of the engine.

As particularly set forth in the various portions of FIG. 8, a complete cycle of the engine can be traced in eight approximately evenly spaced steps going from an arbitrary datum or starting position through one rotation and then back to the starting position.

As shown in FIG. 8a, an arbitrary starting position 10° after a base or datum position at 0° is chosen. The stator 8 is represented as fixed, whereas the rotor ring 24 and the rotor ring 26 are linked together in a position with one piston 46 near one extreme position in its total axial stroke, and with the other piston 47 near the other axial extreme position of its stoke. The pistons, rotor rings and stator define temporary, successively changing, expansible chambers. These, depending largely upon their temporary function, are indicated in the drawings as A, B, C and D and appear in different positions in different portions of FIG. 8. The rotor rings are considered to be advancing toward the right in FIG. 8, as shown by the arrows R, and in FIG. 8a have advanced 10° from the 0° datum location. The hollow piston 46 has just been filled with ignited combustible material now under high pressure and still burning, although the stator spark port 69 and the piston spark port 72 are no longer in communication. The burning, high pressure mixture can only escape from the piston interior through the piston exhaust ports 76. This affords an expansion or power force within a new chamber A between the diagrammatically shown rotor ring 26 and the stator 8. During this time in an adjacent chamber B, exhaust gas from a previous combustion exits through the exhaust port 77 and the exhaust outlet 62. On the other side of the stator, a chamber C in the rotor ring 24 is in communication with an inlet port 58 and thus is full of recently aspirated combustible mixture. Another chamber D is just starting to expand but is not yet in communication with anything.

When both rotor rings have advanced 50° to the 60° position, as shown in FIG. 8b, the A chamber has continued to expand while furnishing rotational power, and the B chamber has continued to contract and expel further exhaust products through the exhaust port 77, the other exhaust duct 62 being blanked off. The chamber C has advanced and left the now closed off intake port 58 and is compressing the contained combustible mixture into the hollow piston 47 through the ports 76 therein. The intake port 59 is supplying mixture to the expanding chamber D.

After a further 60° of rotation into the 120° position, as shown in FIG. 8c, the A chamber is still expanding and furnishing power while the B chamber is in the latter part of its exhaust stroke through the port 77. The C chamber is still compressing combustible mixture into the piston 47, and the D chamber is inducing mixture from the intake port 59. The ports 58 and 62 are blanked off. After another 60° rotation into the 180° position, as shown in FIG. 8d, the piston 46 has been moved to a central location axially of the stator 8 and is blanked off, as is the exhaust port 77. The A chamber is open to the exhaust port 62 and also abuts the centralized piston 47. Momentarily, there is no B chamber. Also momentarily, there is no C chamber. The D chamber is in contact with both centralized pistons 46 and 47 and is open to and receiving combustible mixture from the inlet port 59. At or shortly before the 180° position, a spark has occurred in the piston 47 and the mixture previously compressed therein is ignited.

After another 10° rotation into the 190° position, as shown in FIG. 8e, the A chamber is still exhausting and the just-ignited mixture from the piston 47 is going through the port 76 into a new B chamber to provide power. A new C chamber is expanding but is so far out of communication. The D chamber is still open to the intake port 59. Fifty degrees later at the 240° position, as shown in FIG. 8f, the A chamber is still exhausting, the B chamber is still furnishing power, the C chamber is aspirating mixture through the port 58, and the D chamber is shrinking and compressing gas into the piston 46. At the 300° point, 60° later, as shown in FIG.8g, the A chamber continues to exhaust, the B chamber is still expanding and furnishing power, the C chamber is continuing the intake function through the port 58, while the D chamber has nearly finished compression of mixture into the piston 46. In the 360° or 0° or datum position, as shown in FIG. 8h, there is momentarily no A chamber, and the B chamber is exhausting through the port 77. There is a spark in the piston 46 just prior to the power stroke illustrated at the 10° position, as shown in FIG. 8a. At the datum position, as in FIG. 8h, there is momentarily no D chamber and the C chamber is in the latter part of its intake stroke.

When the parts continue fully into the first described 10° position, as shown in FIG. 8a, a complete revolution of the rotor rings has been made and two ignition or combustion and power events have occured. While the so-called 4-stroke cycle has been followed, the use of two separate hollow pistons and two rotor rings affords two power impulses per revolution instead of but one power impulse for each two rotations of the customary, single acting, single cylinder engine.

Through repeated performances of the foregoing sequence, the 4-event Otto cycle is performed and the rotor rings are impelled to drive the shaft 16, from which power may be withdrawn. During this operation, lubrication maintains the rubbing parts under low-friction conditions and the cooling of the stator assists in maintaining temperatures at appropriate values. There has thus been provided a rotary engine operating on the 4-event Otto cycle in a smooth, continuous, improved fashion.

I claim:

1. A rotary engine comprising a stator concentric with an axis and having opposite sides substantially normal to said axis, means defining a cylinder extending through said stator parallel to said axis, a pair of rotor rings, means for mounting said rotor rings in abutment with said opposite stator sides and for rotation about said axis, a pair of complementary and axially undulatory cam rings, means for mounting said cam rings respectively in said rotor rings for rotation therewith and with a substantially constant axial distance between said cam rings thereby defining working chambers between said cam rings and said stator sides, a unitary hollow piston disposed in said cylinder with the axially opposite ends of said piston in abutment with said cam rings, said hollow piston having one-piece walls including a leading wall and an outermost wall and a trailing wall defining a substantially enclosed explosion chamber of fixed volume within said piston, means defining intake and exhaust ports through said leading and trailing walls in position for alternate masking of said ports by said stator and for connection of said explosion chamber through said ports to said working chambers alternately on opposite sides of said stator, means in said stator open to said working chambers for conducting fuel mixture and exhaust to and from said working chambers, and means for igniting said fuel mixture within said explosion chamber including means defining an ignition port in said piston outermost wall and including an ignition chamber provided with an ignition device and open to said explosion chamber through said ignition port in one relative position of said stator and said explosion chamber.

2. A device as in claim 1 in which said ignition port extends radially through said outermost wall of said piston near the axial center of said outermost wall.

* * * * *